US010787310B2

(12) United States Patent
Vanni et al.

(10) Patent No.: US 10,787,310 B2
(45) Date of Patent: Sep. 29, 2020

(54) CARTRIDGE FOR PREPARING A LIQUID PRODUCT

(75) Inventors: Alfredo Vanni, Turin (IT); Alberto Cabilli, Turin (IT); Marco Mandelli, Turin (IT)

(73) Assignee: Luigi Lavazza S.p.A., Turin (IT)

( * ) Notice: Subject to any disclaimer, the term of this patent is extended or adjusted under 35 U.S.C. 154(b) by 606 days.

(21) Appl. No.: 13/992,803

(22) PCT Filed: Dec. 7, 2011

(86) PCT No.: PCT/IB2011/055512
§ 371 (c)(1),
(2), (4) Date: Jun. 10, 2013

(87) PCT Pub. No.: WO2012/077066
PCT Pub. Date: Jun. 14, 2012

(65) Prior Publication Data
US 2013/0259983 A1 Oct. 3, 2013

(30) Foreign Application Priority Data
Dec. 10, 2010 (IT) .............................. TO2010A0982

(51) Int. Cl.
*B65D 85/804* (2006.01)
*A47J 31/36* (2006.01)
*B65D 65/46* (2006.01)

(52) U.S. Cl.
CPC ...... *B65D 85/8043* (2013.01); *A47J 31/3676* (2013.01); *B65D 65/466* (2013.01); *Y02W 90/14* (2015.05)

(58) Field of Classification Search
CPC . B65D 85/8043; B65D 65/466; A47J 31/3676
See application file for complete search history.

(56) References Cited

U.S. PATENT DOCUMENTS

| 3,292,527 A | 12/1966 | Stasse |
| 3,403,617 A | 10/1968 | Lampe |

(Continued)

FOREIGN PATENT DOCUMENTS

| CH | 406 561 | 8/1966 |
| EP | 0 199 953 | 12/1986 |

(Continued)

OTHER PUBLICATIONS

Cellouse, SChroeter, J. & Felix, F. Cellulose (2005) 12: 159. https://doi.org/10.1007/s10570-004-0344-3 Retrieved from the Internet: URL:<https://link.springer.com/article/10.1007/s10570-004-0344-3#citeas>.*

(Continued)

*Primary Examiner* — Viren A Thakur
*Assistant Examiner* — C A Smith
(74) *Attorney, Agent, or Firm* — Nixon & Vanderhye P.C.

(57) ABSTRACT

A cartridge (10) containing a dose (12) of at least one substance, such as powdered coffee, for preparing a liquid product by means of liquid and/or steam introduced at a given temperature into the cartridge (10) comprises a casing (14) containing the aforesaid dose (12) with a side wall (140) and a bottom wall (142) through which the liquid product flows out from the cartridge (10). The aforesaid bottom wall (142) has a layered structure with: at least one layer (1420) made of a first compostable material designed to undergo softening and/or melting at a temperature ranging between 70° C. and 120° C.; and—at least one layer (1422) made of a second compostable material that does not undergo appreciable softening and/or melting at said temperature.

9 Claims, 5 Drawing Sheets

(56) References Cited

U.S. PATENT DOCUMENTS

| | | | |
|---|---|---|---|
| 3,470,812 A | 10/1969 | Levinson | |
| 3,607,297 A | 9/1971 | Fasano | |
| 4,136,202 A | 1/1979 | Favre | |
| 5,398,596 A | 3/1995 | Fond | |
| 5,472,719 A | 12/1995 | Favre | |
| 2005/0150390 A1 | 7/2005 | Schifferle | |
| 2007/0259139 A1* | 11/2007 | Furneaux | B32B 23/08 428/34.3 |

FOREIGN PATENT DOCUMENTS

| | | |
|---|---|---|
| EP | 0 211 511 | 2/1987 |
| EP | 0 242 556 | 10/1987 |
| EP | 0 468 078 A1 | 1/1992 |
| EP | 0 469 162 A1 | 2/1992 |
| EP | 0 561 982 B1 | 3/1995 |
| EP | 0 497 838 B1 | 4/1995 |
| EP | 0 788 733 B1 | 10/1999 |
| EP | 0 723 572 B1 | 12/1999 |
| EP | 0 868 275 B1 | 2/2000 |
| EP | 0 971 818 B1 | 5/2005 |
| EP | 1 555 219 A1 | 7/2005 |
| EP | 1 816 936 B1 | 7/2008 |
| EP | 2 218 653 | 8/2010 |
| EP | 2 218 653 A1 | 8/2010 |
| EP | 2 239 211 A1 | 10/2010 |
| EP | 1 842 944 B9 | 2/2012 |
| FR | 757.358 | 12/1933 |
| FR | 1.537.031 | 8/1968 |
| FR | 2 373 999 | 7/1978 |
| FR | 2 556 323 | 6/1985 |
| FR | 2 617 389 | 1/1989 |
| GB | 938617 | 10/1963 |
| GB | 2 023 086 A | 12/1979 |
| RU | 2 349 244 | 10/2007 |
| WO | WO86/02537 | 5/1986 |
| WO | WO 92/07775 | 5/1992 |
| WO | 2000/005068 A1 | 2/2000 |
| WO | 2003/073896 A1 | 9/2003 |
| WO | 2005/030482 A1 | 4/2005 |
| WO | 2006/031568 A2 | 3/2006 |
| WO | 2008/107645 A2 | 9/2008 |
| WO | WO 2009/090380 | 7/2009 |
| WO | 2010/106516 A1 | 9/2010 |
| WO | WO 2010/106516 | 9/2010 |
| WO | WO 2010/106516 A1 | 9/2010 |
| WO | WO 2010/137945 A1 | 12/2010 |

OTHER PUBLICATIONS

Russian Office Action dated Jun. 26, 2015 for corresponding Russian Application No. 2013131793/12(047532) (with translation).
Chinese Office Action dated Feb. 2, 2015 for corresponding Chinese Application No. 201180059145.3.
Int'l. Search Report for PCT/IB2011/055512, dated Mar. 15, 2012.
Communication of a Notice of Opposition dated Nov. 9, 2015, issued in European Application No. 11805605.0/ European Patent No. 2648579, 41 pages.
Patent Examination Report No. 1 dated Feb. 22, 2016, issued in Australian Patent Application No. 2011340118.
Eval Evoh Barrier Film, Technical Brochure, Kuraray Co., Ltd., Oct. 2010, 12 pages.
Eval Evoh Resins, Technical Brochure, Kuraray Co., Ltd., Apr. 2011, 28 pages.
Evoh Material Safety Data Sheet, Oct. 11, 2007, 5 pages.
Evasin EV3851 Data Sheet, Chang Chun Petrochemical Co., Ltd., 2 pages.
Eval Evoh Material Safety Data Sheet, Kuraray America, Inc., No. Eval 01, Issue Date: Jan. 6, 2012, 6 pages.
Polylactic Acid (PLA) Typical Properties, Product Description, 3 pages.
Futerro Safety Data Sheet, Futerro Polylactic Acid Oligomers, Version (en) nr: 1.00, 7 pages.
MakerPoint PLA, Data Sheet, Mar. 31, 2014, 2 pages.
Polymer Data Handbook, Oxford University Press, Inc., 1999, cover, pp. 39-48, 114-117, 627-633, and 890-909.

* cited by examiner

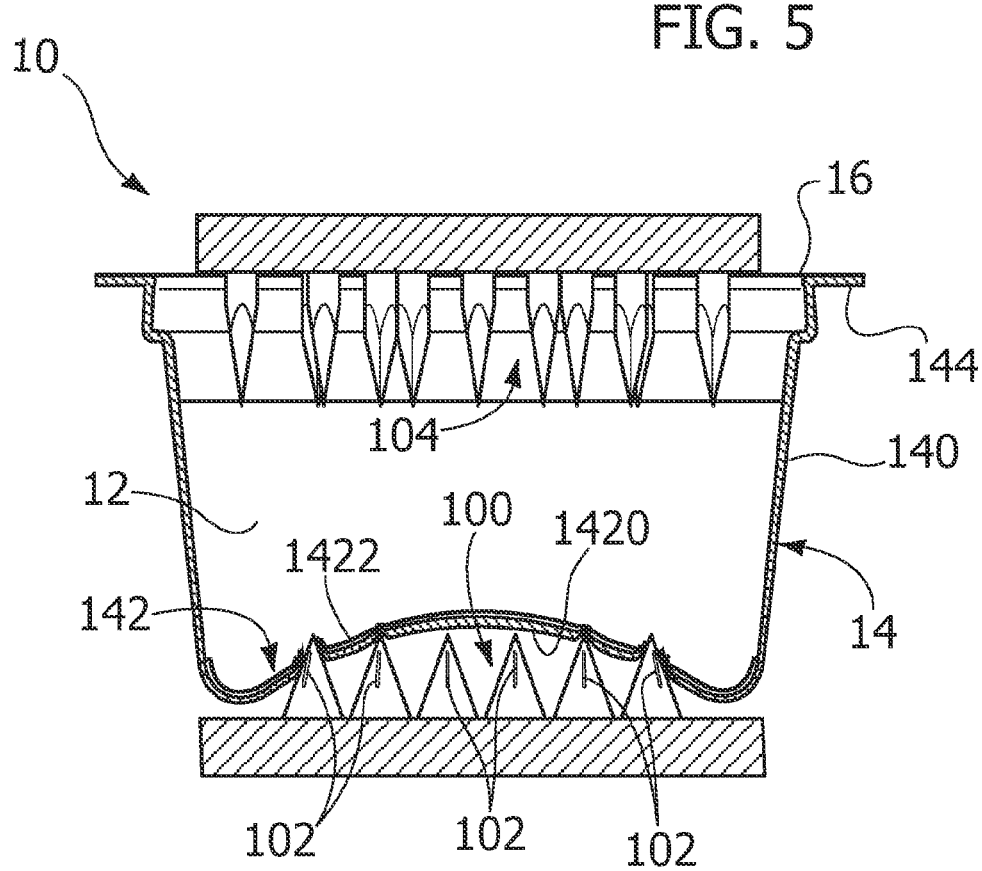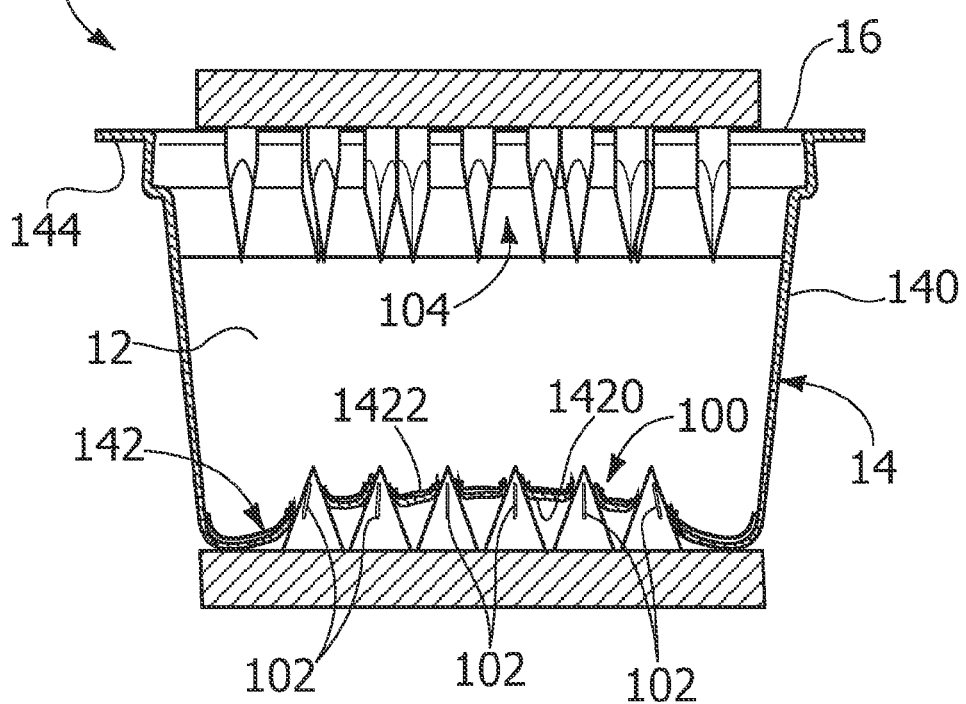

CARTRIDGE FOR PREPARING A LIQUID PRODUCT

This application is the U.S. national phase of International Application No. PCT/IB2011/055512, filed 7 Dec. 2011, which designated the U.S. and claims priority to IT Application No. TO2010A000982, filed 10 Dec. 2010, the entire contents of each of which are hereby incorporated by reference.

TECHNICAL FIELD

The present description relates to cartridges for preparing liquid products.

In various embodiments, the description refers to cartridges for preparing beverages, such as, for example, coffee.

TECHNOLOGICAL BACKGROUND

Cartridges for preparing a liquid product, such as, for example, a beverage, by introducing into the cartridge liquid (possibly under pressure and/or at high temperature) and/or steam constitute a technological sector that is extremely rich and articulated, as documented, for example, by FR-A-757 358, FR-A-2 373 999 (corresponding to which is U.S. Pat. No. 4,136,202), FR-A-2 556 323, GB-A-938 617, GB-A-2 023 086, CH-A-406 561, U.S. Pat. Nos. 3,403,617, 3,470, 812, 3,607,297 (corresponding to which is FR-A-1 537 031), WO-A-86/02 537, EP-A-0 199 953, EP-A-0 211 511, EP-A-0 242 556, EP-A-0 468 078, EP-A-0 469 162, and EP-A-0 507 905.

A fair part of the solutions described in the documents referred to above primarily regards the preparation of liquid products constituted by beverages such as coffee, tea, chocolate, broth, soups, or various infusions. As regards the preparation of coffee, known (for example from EP-A-0 507 905, already mentioned previously and taken as model for the preamble of Claim 1) are solutions designed to enable the preparation of espresso coffee.

OBJECT AND SUMMARY

In the current practice of producing said cartridges, as adopted by the present applicant in the production of cartridges sold under the trade name Lavazza Blue®, it is envisaged that the side wall and the bottom wall of the cartridge are made of plastic material, such as, for example, polypropylene co-extruded in lamination with ethylene vinyl alcohol (EVOH), shaped by thermoforming.

Said composite material cannot, however, be classified as compostable material.

The characteristics that a material must possess for it to be defined as "compostable", according to a definition commonly adopted also at a patent level (see, for example, EP-B-0 497 838, EP-B-0 561 982, EP-B-0 788 733, EP-B-0 723 572, EP-B-0 868 275, EP-B-0 971 818, and EP-B-1 842 944), are currently established by the European Norm EN 13432 "Requirements for packaging recoverable through composting and biodegradation—Test scheme and evaluation criteria for the final acceptance of packaging", recently adopted also in Italy as UNI EN 13432. According to said norm, the characteristics that a compostable material must present are the following:

Biodegradability, i.e., the metabolic conversion of the compostable material into carbon dioxide. This property is measured with a standard testing method, namely prEN 14046 (also published as ISO 14855: biodegradability under controlled composting conditions). The level of acceptance is 90% biodegradability (with respect to cellulose) to be achieved in less than 6 months.

Disintegrability, i.e., the fragmentation and loss of visibility in the final compost (absence of visual contamination). Measured with a composting test on a pilot scale (prEN 14045). Samples of the test material are composted together with organic waste for 3 months. At the end, the compost is sifted with a 2-mm sieve. The mass of residue of the test material with a size greater than 2 mm must be less than 10% of the initial mass.

Absence of adverse effects on the composting process, verified with a composting test on a pilot scale.

Low levels of heavy metals (below predefined maximum values) and absence of adverse effects on the quality of the compost (e.g., reduction of the agronomic value and presence of ecotoxicological effects on the growth of plants). A plant-growth test (test OECD 208, modified) is carried out on samples of compost where degradation of the test material has occurred. No difference must be highlighted as compared to a control compost.

Other chemico-physical parameters that must not change after degradation of the material being studied: pH; saline content; volatile solids; N; P; Mg; K.

It will be appreciated that a biodegradable material is not necessarily compostable because it must also disintegrate during a composting cycle. On the other hand, a material that breaks up during a composting cycle into microscopic pieces that are not then, however, totally biodegradable is not compostable.

UNI EN 13432 is a harmonized norm; i.e., it has been published in the Official Journal. of the European Union and is adopted in Europe at a national level and envisages presumption of compliance with the European Directive No. 94/62 EC, on packaging and packaging waste.

Following upon the increasing interest in the environment and in the end of life of everyday foodstuff waste, compostability is a requirement that is deemed increasingly important by consumers of the cartridges considered herein.

In this regard, the inventors have noted that, purely in terms of production, it may certainly be possible to envisage the solution of resorting, in order to produce the casing of such a cartridge, to a compostable material (according to a term sometimes used in the sector, a "bio" material), such as for example: polymers extracted from biomass (e.g., polysaccharides such as starch—MATER-BI® supplied by NOVAMONT SPA, Novara, Italy, a family of biodegradable and compostable bioplastics obtained by starches, cellulose, vegetable oils and their combinations—cellulose, lipids, proteins); synthetic polymers (e.g., polylactic acid—PLA— derived from the fermentation of starch); polymers produced by micro-organisms or genetically modified bacteria (e.g., polyhydroxyalckanoates—PHAs); polymers from fossil monomers (e.g., polybutylsuccinate—PBS). There may be numbered in said category also mixtures of the above (the so-called "compounds") with or without the introduction of additives, such as nanoparticles (e.g., talc, Cloesite).

In the application considered herein, in which (for example, during preparation of a beverage such as coffee or espresso coffee) the liquid and/or the steam introduced into the cartridge may be at temperatures of around 100° C., it happens that the aforesaid compostable materials undergo softening or melting, a circumstance basically due to the fact that they are materials of natural origin.

This entails drawbacks of operation, according to the material considered, linked, for example, to the risk of the bottom wall of the cartridge behaving in an uncontrolled manner, whilst it is being perforated during the process of preparation of the liquid product, alternatively rupturing in a random way or else obstructing, on account of a high creep at high temperatures, the orifices provided in the means, such as needles or tips, designed to perform the aforesaid operation of perforation, or else again undergoing considerable elongation at yield like a stocking on said perforating tips, in effect obstructing outflow of the beverage.

In this regard, it should also be considered that the liquid and/or steam can be introduced into the cartridge at pressures even higher than 10 atm.

The object of the present invention is to overcome the aforesaid drawbacks.

According to the invention, said object is achieved thanks to a cartridge having the characteristics recalled in Claim 1. Advantageous developments of the invention form the subject of the dependent claims.

The claims form an integral part of the technical disclosure provided herein in relation to the invention.

In various embodiments, the cartridge as a whole constitutes a packaging material that can be recovered by composting and biodegradation, for example in compliance with the norm UNI EN 13432:2002 and/or subsequent modifications and integrations.

BRIEF DESCRIPTION OF THE DRAWINGS

The invention will now be described, purely by way of non-limiting example, with reference to the annexed figures, wherein:

FIGS. 2 to 6 illustrate successive steps of a possible sequence of use of an embodiment;

DETAILED DESCRIPTION

Figure 1:
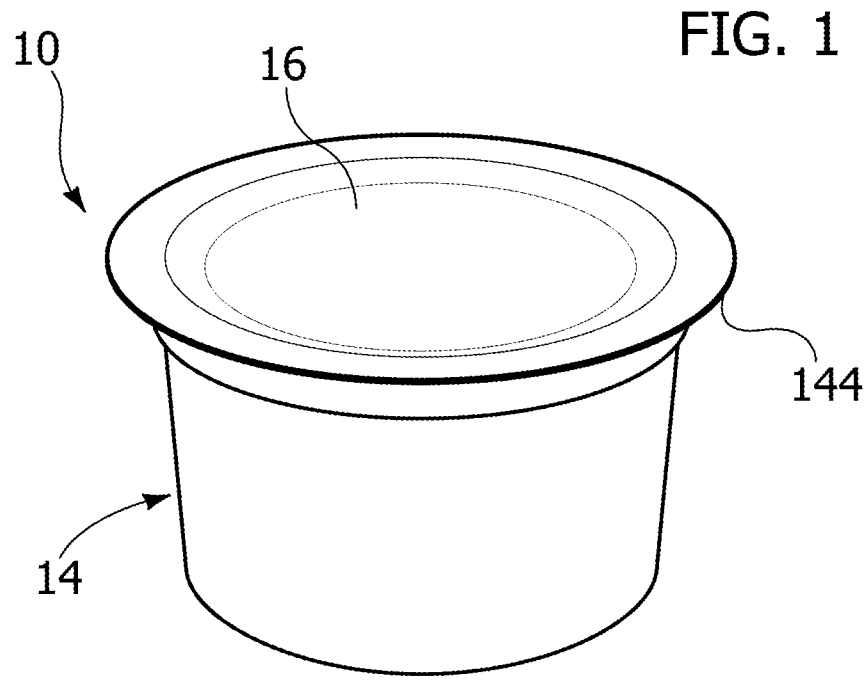
FIG. 1 is a general perspective view of a cartridge according to one embodiment.

Illustrated in the ensuing description are various specific details aimed at providing an in-depth understanding of the embodiments. The embodiments may be provided without one or more of the specific details, or with other methods, components, materials, etc. In other cases, known structures, materials, or operations are not shown or described in detail so that the various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. Moreover, particular conformations, structures, or characteristics can be combined in any adequate way in one or more embodiments.

The references used herein are provided merely for convenience and hence do not define the sphere of protection or the scope of the embodiments.

In the figures, the reference number 10 designates as a whole a cartridge for preparing a liquid produced by introducing liquid and/or steam into the cartridge.

In various embodiments, the liquid product in question may be constituted by a beverage such as coffee (for example, espresso coffee) obtained by introducing liquid and/or steam under pressure into the cartridge and at a high temperature (i.e., hot).

In any case, the repeated reference, in the framework of the present detailed description, to the preparation of the beverage coffee is in no way to be understood in any sense limiting the scope of the description, which is altogether general.

The cartridge 10 contains a dose 12 of at least one substance that is able to form the aforesaid product via the aforesaid liquid and/or steam.

In various embodiments, the dose 12 may be constituted by powdered coffee, or by another precursor of a liquid product such as, for example, a beverage, tea, chocolate either in powdered or granular form, products for preparing broths, soups, beverages, infusions of various nature, etc. Said list is be understood as purely having the nature of example and is in no way binding.

In various embodiments, in the structure of the cartridge 10, shaped as a whole substantially as a tray or small cup or beaker, located within which is the dose 12, there may be distinguished:

a casing 14, comprising a side wall 140 and a bottom wall 142 that closes the casing 14 at one end of the side wall 140; and a sealing foil 16, which closes the cartridge 10 at the end opposite to the bottom wall 142.

Such a material is suited to being connected in a fluid-tight way, for example by heat sealing, to the side wall 140 of the casing 14 of the cartridge, for example in an area corresponding to a flange 144 that surrounds the mouth part of the aforesaid casing 140.

In various embodiments, as represented in the annexed figures, the casing 14 may be shaped like a tray diverging starting from the bottom wall 142 towards the end closed by the sealing foil 16. In various embodiments, said divergent conformation may be a frustoconical conformation. Said conformation is not, however, imperative in so far as the cartridge 10 can have as a whole different shapes, for example, a prismatic shape, a frustopyramidal shape, etc.

In various embodiments, the bottom wall 142 may have a concave-vault conformation. In the embodiments illustrated herein, the concavity of said vault faces the outside of the cartridge 10.

Also in this case, the choice of said conformation is not imperative. In various embodiments, the concave-vault shape may have the concavity facing the inside of the cartridge 10. In various embodiments, the bottom wall 142 may be plane or substantially plane.

In various embodiments, the sequence of use of the cartridge 10 may be substantially similar to the sequence of use of the cartridge described in EP-A-0 507 905, already cited previously.

In particular, in an initial step (FIG. 2) the cartridge 10 is laid on an array of bottom tips 100. In various embodiments, the tips in question may have a hollow structure, substantially similar, to that of a syringe needle, with one or more openings 102 designed to enable outflow of the liquid product prepared using the cartridge 10 according to the modalities that will be described more fully in what follows.

In various embodiments, when the cartridge 10 is laid on the bottom tips 100, the bottom 142 (whether concave with concavity facing the outside or the inside of the cartridge or else plane) may rest simply on the tips 100.

Figure 2:
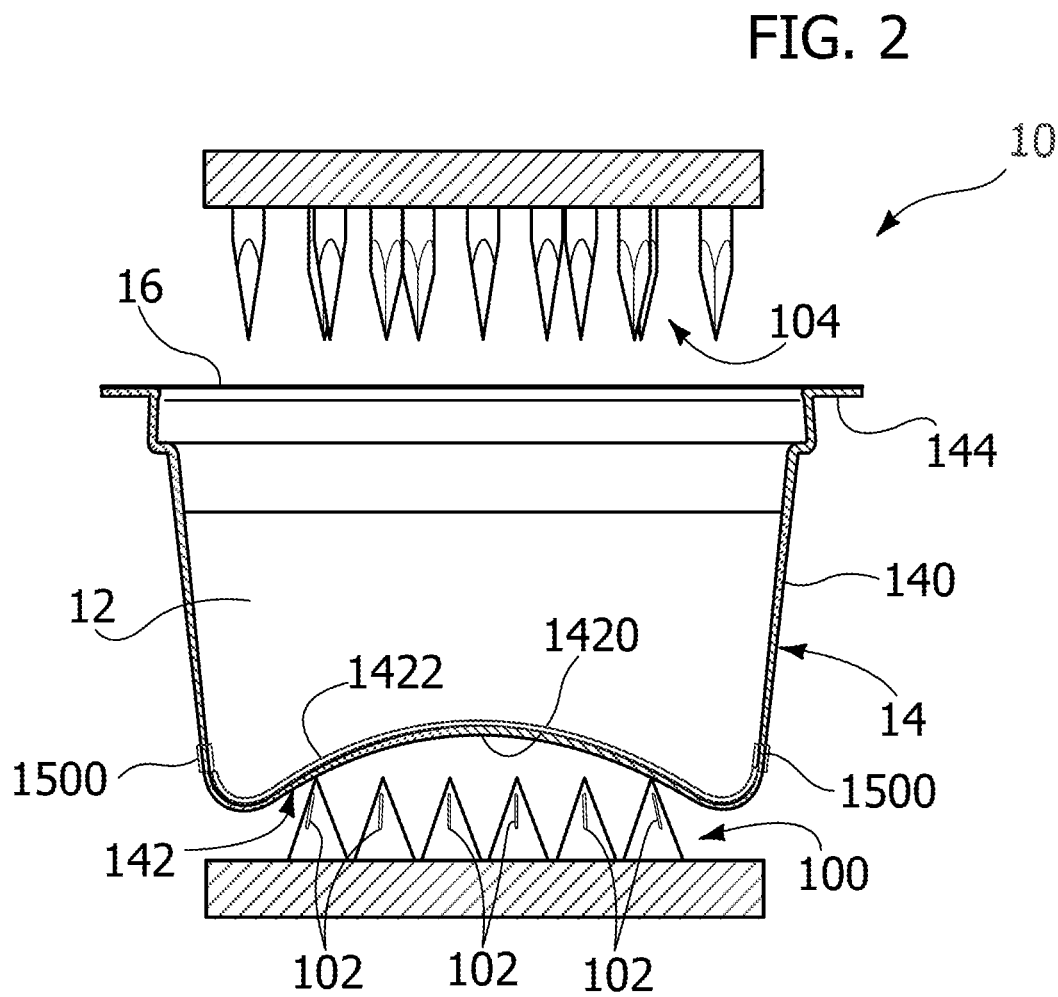

As may be seen more clearly in FIG. 2, at the same time the top foil 16 of the cartridge 10 is exposed to another array of tips (top tips 104 designed to perforate the film 16 constituting the top sealing foil of the cartridge).

Figure 3:
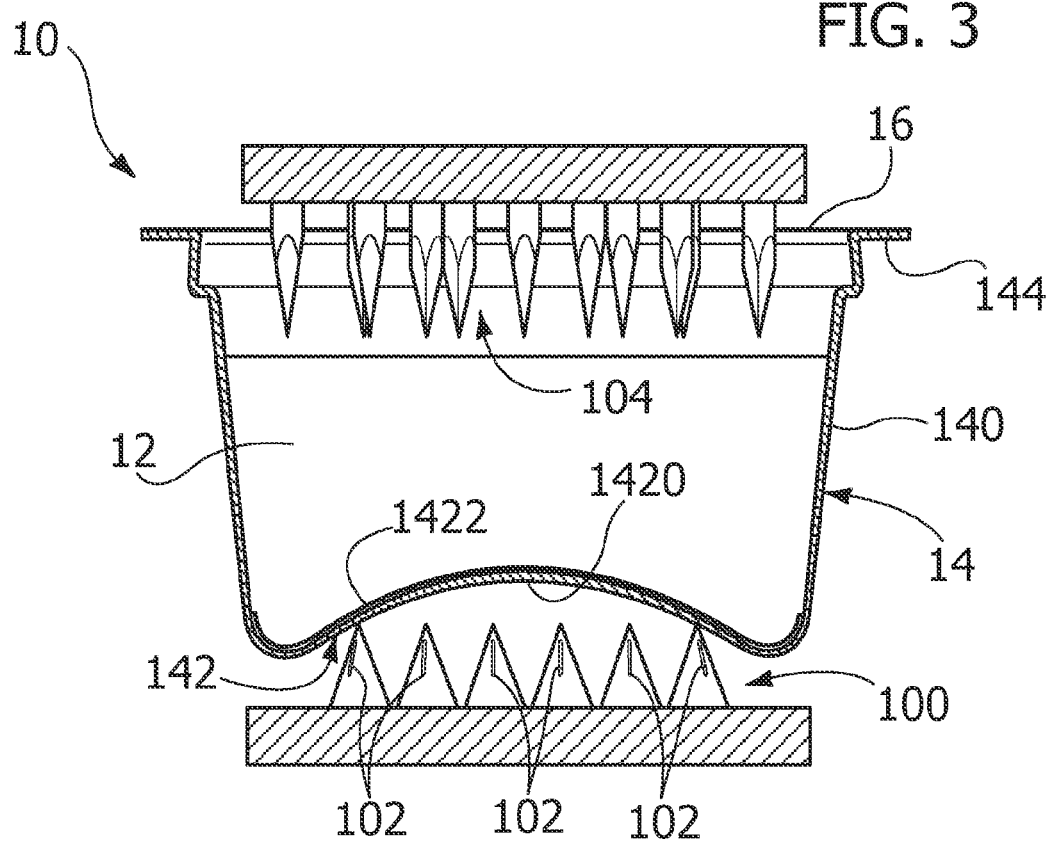

In a first step of the method of preparation (in the embodiments considered herein reference will be made—by way of non-limiting example—to the preparation of coffee, such as, for example, espresso coffee), as represented schematically in FIG. 3, the top tips 104 descend from the top downwards (under the action of motor means, not visible in the figures) and penetrate into the sealing foil 16, perforating it. In this way, the cartridge 10 is opened on its top side.

At this point, the machine for preparing the beverage (for example, a machine for preparing coffee, of a known type, which renders any detailed description herein superfluous) is activated in such a way that the water starts to penetrate through the holes formed by the tips 104 in the top foil 16 (starting from a pump not illustrated, which, in the preparation of espresso coffee, is supplied at a temperature in the region of 90-100° C. approximately and at a pressure in the region of 8-10 atm or more).

Figure 4:
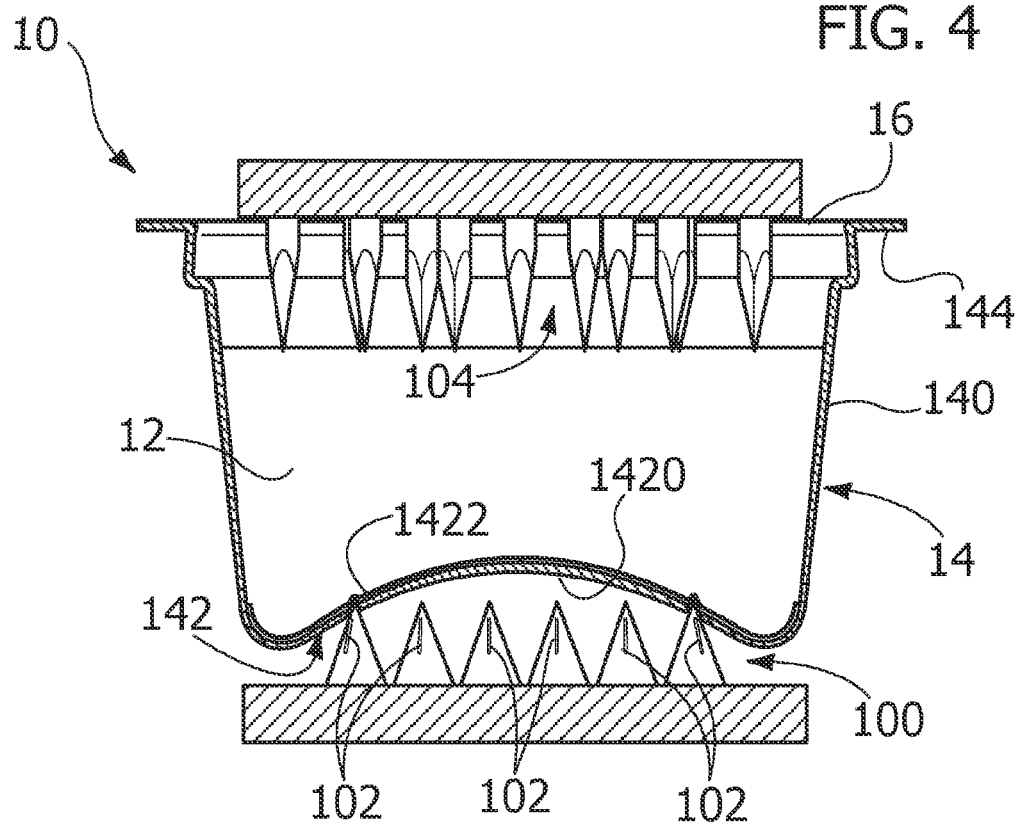
Figure 7:
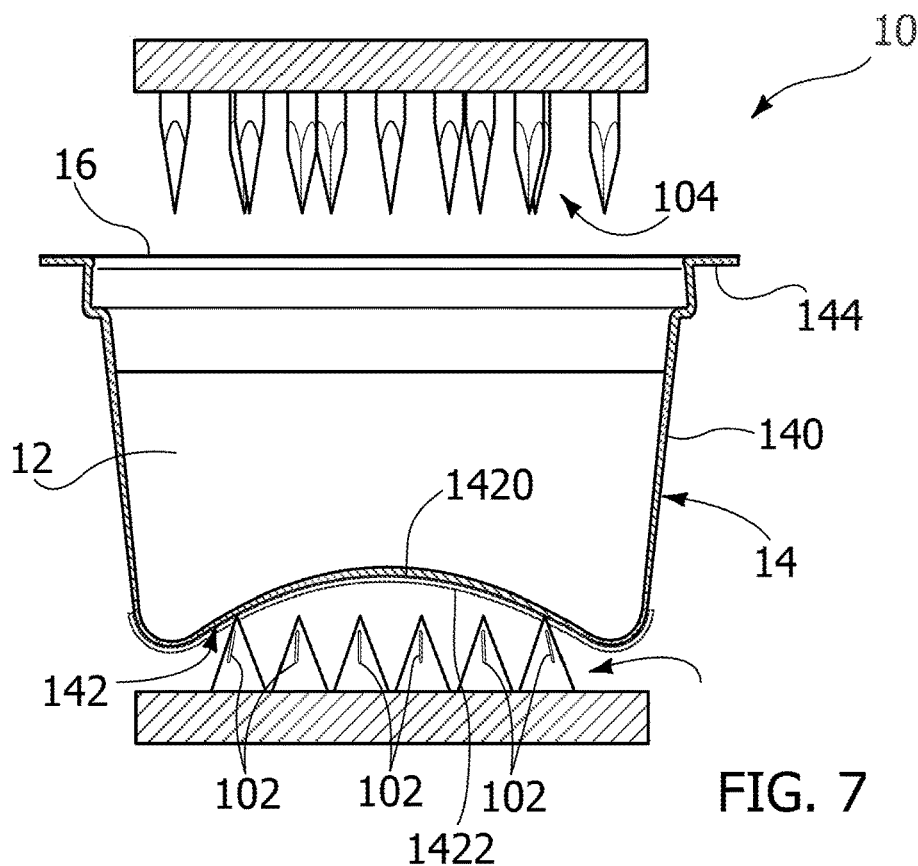
FIG. 7 is similar to FIG. 2, but is an embodiment showing the layer made of a first compostable material (1420) arranged internally of the cartridge.
Figure 8:
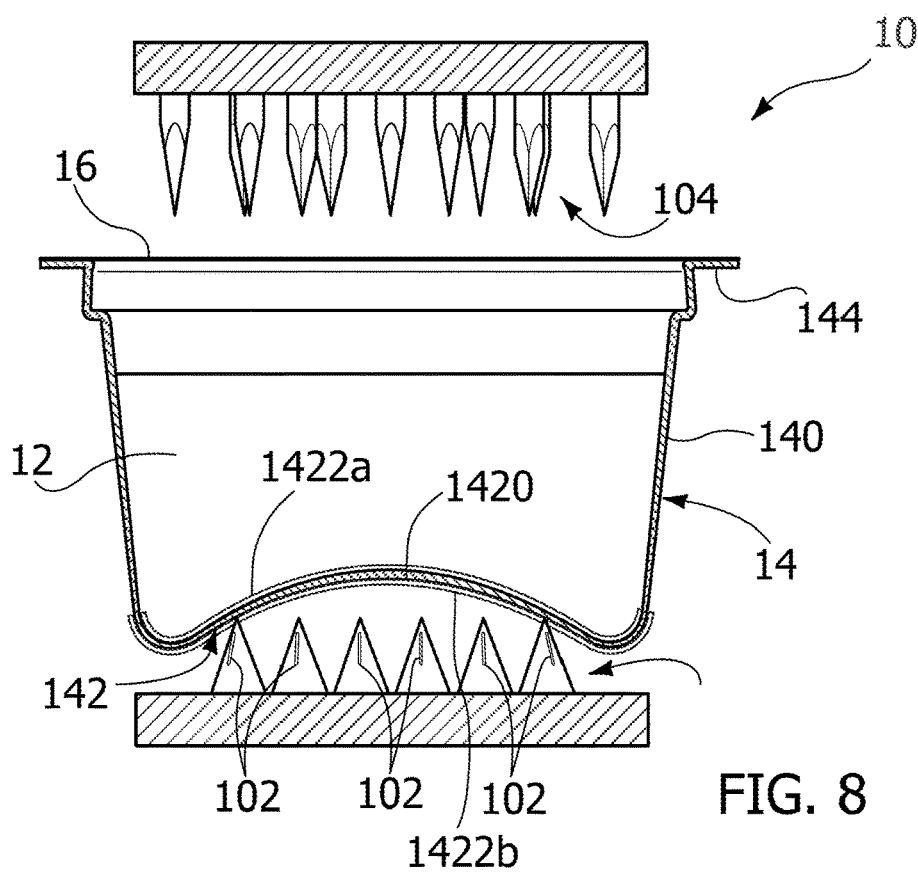
FIG. 8 is similar to FIG. 2, but is an embodiment showing the bottom wall (142) including a sandwich structure wherein the layer of the first compostable material (1420) is between two layers of the second compostable material (1422a and 1422b)
Figure 9:
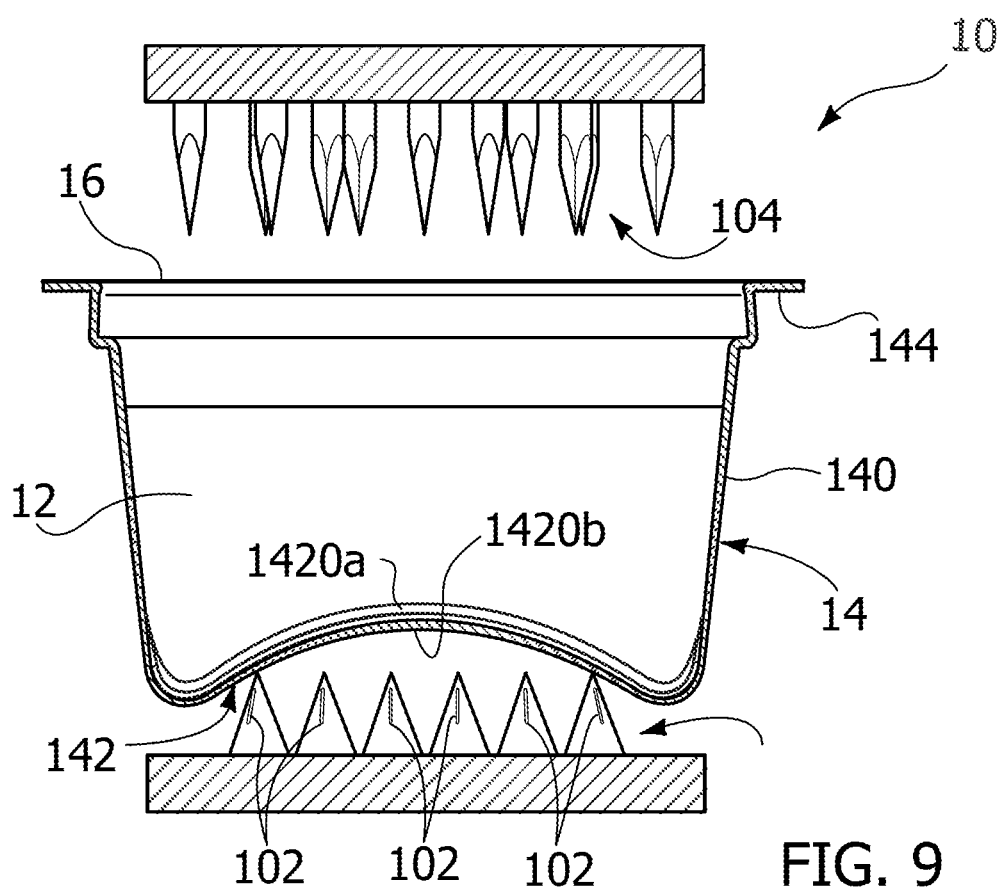
FIG. 9 is similar to FIG. 2, but is an embodiment showing the bottom wall (142) including a sandwich structure wherein the layer of the second compostable material is between two layers of the first compostable material (1420a and 1420b).

This operating condition is represented schematically in FIG. 4.

In various embodiments, the hot pressurized water that flows inside the cartridge 10 may perform a dual function.

In the first place, the hot water starts to penetrate in the dose 12 of powdered coffee starting the process (which can be identified, perhaps in a not altogether precise way, as "infusion process") that leads to preparation of the beverage.

In the second place, as may be better appreciated in the bottom part of FIG. 4, the pressure that is set up within the cartridge 10 causes the bottom 142 to start to be deformed and pushed against the tips 100 on which the bottom wall 142 itself rests.

In an initial step (represented precisely in FIG. 4), the penetration of the tips 100 into the bottom wall 142 is only partial: the tips 102 only start to deform the bottom 142 of the cartridge 10, creating "dimples" therein.

In a next step, represented in FIG. 5, the bottom tips 100 start to perforate the bottom wall 142 of the cartridge 10 so that the cavity provided in these tips (as has already been said previously in various embodiments these are in fact hollow tips, similar to syringe needles) enters into communication, through the opening 102, with the internal volume of the cartridge 10 so that the coffee infusion starts to come out of the cartridge 10 and to flow out through the bottom tips 100.

The mechanism of perforation of the bottom wall 142 of the cartridge 10 proceeds as illustrated in FIG. 6, until practically each of the bottom tips 100 has perforated the bottom wall 142 of the cartridge 10, penetrating within the cartridge 10 itself so that the axial cavity of the tip provides an outflow path for supply of the coffee infusion.

The condition represented in FIG. 6 is maintained until preparation of the beverage is completed.

At this point, the pump that sends the hot pressurized water within the cartridge 10 is de-activated, the top tips 104 (if this has not already been made previously) are recalled upwards, and the "used" cartridge 10 can be taken out of the machine and replaced with a "new" cartridge to prepare another coffee.

For what is of interest herein, in various embodiments, the perforation of the bottom wall 142, instead of coming about following upon introduction of the liquid and/or of the steam within the cartridge 10, may even take place in "cold" conditions, following upon an action of perforation by the tips 100 of the bottom part 142 of the cartridge 10 laid on the tips 107 (before, simultaneously with, or after perforation of the sealing foil 16 by the tips 104) also prior to penetration of liquid and/or steam into the cartridge 10.

As has already been said in the introductory part of the present description, an operating sequence like the one schematically illustrated in FIGS. 2 to 6 is hardly compatible with the choice of making the bottom wall 142 of a compostable material.

A "bio" material of this nature is, in fact, likely to undergo loss of the main thermomechanical properties during perforation by perforating tips at the temperature of production of the beverage, which is approximately 100° C. Drawbacks of operation, according to the bio material considered, may be linked, for example, to the risk of the bottom wall of the cartridge behaving in an uncontrolled manner, whilst it is being perforated during the process of preparation of the liquid product, alternatively rupturing in a random way or else obstructing, on account of a high creep at high temperatures, the orifices provided in the means, such as needles or tips, designed to perform the aforesaid operation of perforation, or else again undergoing considerable elongation at yield like a stocking on said perforating tips, in effect obstructing outflow of the beverage through the holes themselves.

In various embodiments, said drawbacks are prevented by producing the bottom wall 142 with a layered structure that envisages coupling to a layer 1420 made of a first compostable material (as defined previously), designed to undergo softening/melting at the temperatures of the liquid/steam introduced into the cartridge 10 in the process of preparation described, a further layer 1422 made of a second material, which is also compostable, but is able to withstand the aforesaid temperatures without undergoing softening/melting.

In various embodiments, the first material of the layer 1420 may be simply a compostable material comprising a material chosen from among:

polymers extracted from biomass (e.g., polysaccharides such as starch—MATER-BI® supplied by NOVAMONT SPA, Novara, Italy, a family of biodegradable and compostable bioplastics obtained by starches, cellulose, vegetable oils and their combinations—cellulose, lipids, proteins);

synthetic polymers (e.g., polylactic acid—PLA derived from the fermentation of starch);

polymers produced by micro-organisms or genetically modified bacteria (e.g., polyhydroxyalckanoates—PHAs);

polymers from fossil monomers (e.g., polybutylsuccinate—PBS); and mixtures of the above (the so-called "compounds") with possible introduction of additives, such as nanoparticles (e.g., talc, cloesite).

At temperatures in the region of 100° C. and/or at pressures of 10 bar or more, such a material has a high elongation at break, deriving from its characteristic of natural material.

In various embodiments, the second material of the layer 1422 is a compostable material, chosen, however, so as not to present in the aforesaid conditions a high elongation at break and so as to be easily torn by perforating tips.

In various embodiments, the second material of the layer 1422 may be simply constituted by a foil of paper, for example, cellulose paper, such as 100% cellulose paper, cardboard, cellophane, cellulose acetate.

The composite material formed by the two materials 1420 and 1422, both of which are compostable, behaves, for the purposes of perforation and subsequent extraction of the beverage, exactly like the non-compostable material (for example, polypropylene co-extruded in lamination with ethylene vinyl alcohol, shaped by thermoforming), which currently constitutes the state of the art in the sector of cartridges for coffee and the like.

In various embodiments, operation of said resulting composite material may envisage that the bottom is punctured, enabling proper exit of the beverage, the material 1422 functioning, in regard to a perforating filter, as yielding element, weakening the overall structure of the bottom and hence preventing the material 1420 from undergoing an excessive elongation or plastic deformation, which would be otherwise invalidating in regard to said puncturing.

The same behaviour would not hence be obtained if the two constituents 1420 and 1422 were used individually.

The layer 1420 enables, in fact, when the bottom wall 142 is perforated by the tips 100, proper fluid-tightness to be ensured around the tips 100, like a gasket, preventing the undesirable dispersion of the liquid product that is being prepared.

The layer 1422 is, instead, able to ensure that the bottom wall 142 will preserve its structural consistency, preventing any excessive elongation and in particular enabling rupturing of the bottom 142 itself at a given amount of insertion of the tips 100 inside the compartment for the cartridge 10.

In various embodiments the elongation at break of the layer designed to undergo softening, i.e., the layer 1420, may be chosen at least 20% higher than that of the material designed not to undergo softening, i.e., the layer 1422.

The condition of coupling between the layer 1420 (designed to undergo softening/melting) and the layer 1422 (designed not to undergo softening/melting at the temperatures of the process of preparation of the beverage) prevents the heat-meltable material of the layer 1420 from obstructing the openings 102.

As regards the coupling modes, in various embodiments, the non-heat-resistant layer 1420 and the heat-resistant layer 1422 may be set, respectively, on the outside and on the inside of the cartridge 10, as schematically illustrated in the annexed figures.

In various embodiments, the arrangement may, instead, be reversed, with the layer 1422 set on the outside and the layer 1420 set on the inside of the cartridge.

In various embodiments there may be envisaged, for obtaining the bottom wall 142, layered structures comprising more than two layers, for example an intermediate heat-resistant layer, made, for instance, of paper, 1422 sandwiched between two non-heat-resistant layers 1420, or else a complementary arrangement, with two heat-resistant layers 1422 that enclose between them a non-heat-resistant layer 1420. Of course, there may also be envisaged layered structures comprising more than three layers.

Also as regards the connection of the bottom wall 142 to the side wall 140 of the casing 14 of the cartridge 10 different solutions may be envisaged.

In various embodiments, the non-heat-resistant layer 1420 or the at least one non-heat-resistant layer 1420 may be made of a single piece, for example, in a single forming operation (co-moulding), with the side wall 142, with the heat-resistant layer or layers 1422 applied on one or both of the faces of the aforesaid layer made of a single piece with the side wall 140.

In various embodiments, the bottom wall 142 may be, instead, provided originally as a layered-structure element by itself designed then to be connected in a fluid-tight way (1500) to the bottom rim (the one of smaller diameter, in the embodiments illustrated herein) of the side wall 140 with techniques chosen from among sealing (heat sealing or ultrasound sealing), gluing, or co-moulding.

In various embodiments, the sealing foil 16 can be provided with a film of a material that can be qualified as compostable material. Such a material may be chosen, for example, in the group constituted by: polymers extracted from biomass (e.g., polysaccharides such as starch—MATER-BI® supplied by NOVAMONT SPA, Novara, Italy, a family of biodegradable and compostable bioplastics obtained by starches, cellulose, vegetable oils and their combinations—cellulose, lipids, proteins); synthetic polymers (e.g., polylactic acid—PLA—derived from the fermentation of starch); polymers produced by micro-organisms or genetically modified bacteria (e.g., polyhydroxyalckanoates—PHAs); polymers from fossil monomers (e.g., polybutylsuccinate—PBS); mixtures of the above (the so-called "compounds") with or without the introduction of additives, such as nanoparticles (e.g., talc, cloesite); paper, cardboard, cellophane, cellulose acetate.

Without prejudice to the principle of the invention, the details of construction and the embodiments may vary, even significantly, with respect to what has been illustrated herein purely by way of non-limiting example, without thereby departing from the scope of the invention, as defined by the annexed claims.

In particular, whereas in the embodiments considered by way of example herein it is envisaged that the bottom wall 142 can be perforated (by the tips 100) to enable the liquid product to flow out from the cartridge 10 through the wall 142 itself, in other embodiments the wall 142 may have right from the start an apertured structure (for example, a porous structure) that can be traversed by said liquid product that flows out from the cartridge 10.

Also in this case, there may be envisaged coupling, within the bottom wall 142, of at least one layer of a first compostable material designed to undergo softening and/or melting (layer 1420 of the figures) and of at least one layer of a second compostable material designed not to undergo softening and/or melting at the temperature of the liquid and/or steam (layer 1422 of the figures) so as to prevent, for example, obstruction of the openings of the apertured structure (for example, the pores of a porous structure) by the compostable material designed to undergo softening/melting.

The invention claimed is:

1. A cartridge with a filling of at least one substance for preparing a liquid product by means of liquid and/or steam introduced at a given temperature into the cartridge, said cartridge including a casing containing said filling with a side wall and a bottom wall for said liquid product to flow from the cartridge, wherein said bottom wall has a layered structure with:

at least one layer of a first compostable material softenable and/or meltable at a temperature between 70° C. and 120° C., selected from the group consisting of:

polymers derived from biomasses, synthetic polymers, polymers produced by micro-organisms or genetically modified bacteria, polymers from fossil monomers, mixtures of said polymers with or without additives and at least one layer of a second compostable material exempt from appreciable softening and/or melting at said temperature selected from the group consisting of: paper, paperboard, cellophane, cellulose acetate, wherein said at least one layer of a first compostable material and said at least one layer of a second compostable material are coupled to form a composite material, and wherein the at least one layer of said first compostable material enables, during bottom wall perforation, fluid-tightness around orifices provided by needles or tips, designed to perform the perforation, thus preventing the undesirable dispersion of the liquid product that is being prepared, the at least one layer of the second compostable material ensures preservation of the bottom wall structure, so that said layered structure of the bottom wall prevents undesirable rupture and/or undesirable obstruction of the outflow of the liquid product that is being prepared, wherein said bottom wall includes a sandwich structure wherein two layers of said first compostable material includes a sandwich structure wherein at least one layer of said second compostable material is between the two layers of said first compostable material.

2. The cartridge of claim 1, wherein said first compostable material has an elongation at break at least 20% higher than said second compostable material.

3. The cartridge of claim 1, including a layer of said first compostable material arranged on the exterior of the cartridge with respect to a layer of said second compostable material.

4. The cartridge of claim 1, wherein said bottom wall is connected to said side wall by said at least one layer of said first compostable material being one-piece with said side wall.

5. The cartridge of claim 1, wherein said bottom wall is connected to said side wall by heat sealing, ultrasound sealing, co-moulding or gluing.

6. The cartridge of claim 1, wherein said cartridge casing integrally comprises compostable material.

7. The cartridge of claim 1, wherein the casing of the cartridge is closed, at the end opposed to said bottom wall, by a sealing foil of a compostable material.

8. The cartridge of claim 7, wherein said sealing foil includes a compostable material selected from the group consisting of: polymers derived from biomasses; synthetic polymers; polymers produced by micro-organisms or genetically modified bacteria; polymers from fossil monomers; mixtures of said polymers with or without additives.

9. The cartridge of claim 1, wherein said bottom wall:
is puncturable to permit flow of said liquid product from the cartridge; or
has an apertured structure adapted to be traversed by said liquid product flowing out of the cartridge.

* * * * *